US010809527B2

(12) United States Patent
Song et al.

(10) Patent No.: US 10,809,527 B2
(45) Date of Patent: Oct. 20, 2020

(54) METHOD FOR SHARING CONTENTS AND ELECTRONIC DEVICE SUPPORTING THE SAME

(71) Applicant: Samsung Electronics Co., Ltd., Suwon-si, Gyeonggi-do (KR)

(72) Inventors: Woo Taek Song, Suwon-si (KR); Hee Bae Park, Seongnam-si (KR); Young Jae Choi, Suwon-si (KR); Hyuk Kang, Yongin-si (KR); Tae Ho Kim, Cheongju-si (KR); Tae Gun Park, Hwaseong-si (KR); Gyu Cheol Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 88 days.

(21) Appl. No.: 15/904,755

(22) Filed: Feb. 26, 2018

(65) Prior Publication Data

US 2018/0246328 A1   Aug. 30, 2018

(30) Foreign Application Priority Data

Feb. 28, 2017   (KR) .......................... 10-2017-0026223

(51) Int. Cl.
| | |
|---|---|
| *G02B 27/01* | (2006.01) |
| *G06F 21/44* | (2013.01) |
| *G06F 16/176* | (2019.01) |
| *H04W 4/18* | (2009.01) |

(52) U.S. Cl.
CPC ......... *G02B 27/017* (2013.01); *G06F 16/176* (2019.01); *G06F 21/44* (2013.01); *H04W 4/18* (2013.01); *G02B 2027/0141* (2013.01)

(58) Field of Classification Search
CPC .......... G02B 27/017; G02B 2027/0141; G06F 21/44; G06F 17/30165; G06F 16/176; H04W 4/18
See application file for complete search history.

(56) References Cited

U.S. PATENT DOCUMENTS

| | | | |
|---|---|---|---|
| 9,159,298 | B2 | 10/2015 | Han et al. |
| 9,215,293 | B2 | 12/2015 | Miller et al. |
| 9,961,494 | B2 | 5/2018 | Kannan |
| 2012/0060109 | A1 | 3/2012 | Han et al. |

(Continued)

FOREIGN PATENT DOCUMENTS

WO   2013/000125 A1   1/2013

*Primary Examiner* — Yaron Cohen
(74) *Attorney, Agent, or Firm* — Jefferson IP Law, LLP

(57) ABSTRACT

An electronic device that interacts with a head mounted display (HMD) device is provided. The electronic device includes a communication interface, a memory, a display, and at least one processor electrically connected to the communication interface, the memory, and the display. The at least one processor is configured to receive an event signal related to sharing of contents with at least one external device or receive request information related to sharing of contents from the at least one external device through the communication interface, identify attribute information of the at least one external device, convert a format of some of one or more contents, which are stored in the memory, such that the format of one or more contents corresponds to the identified attribute information, and transmit the contents to the at least one external.

17 Claims, 12 Drawing Sheets

(56) References Cited

U.S. PATENT DOCUMENTS

| | | |
|---|---|---|
| 2013/0117377 A1 | 5/2013 | Miller et al. |
| 2014/0053078 A1 | 2/2014 | Kannan |
| 2014/0129676 A1 | 5/2014 | Zeng et al. |
| 2014/0320974 A1* | 10/2014 | Magyari ............ G02B 27/0172 359/631 |
| 2015/0032823 A1 | 1/2015 | Miller et al. |
| 2016/0100034 A1 | 4/2016 | Miller et al. |
| 2016/0225189 A1* | 8/2016 | Nishizawa .............. G06F 3/011 |
| 2016/0359930 A1 | 12/2016 | Miller et al. |
| 2016/0364198 A1 | 12/2016 | Song et al. |
| 2017/0147274 A1* | 5/2017 | Oh ........................ G06F 3/0346 |
| 2018/0124570 A1 | 5/2018 | Kannan |

* cited by examiner

| EXTERNAL DEVICE | SETTING OF SHARING OF CONTENTS |
|---|---|
| AAA | OFF |
| BBB | OFF |
| CCC | ON |
| ⋮ | |

FIG.4A

METHOD FOR SHARING CONTENTS AND ELECTRONIC DEVICE SUPPORTING THE SAME

CROSS-REFERENCE TO RELATED APPLICATION(S)

This application is based on and claims priority under 35 U.S.C. § 119(a) of a Korean patent application number 10-2017-0026223, filed on Feb. 28, 2017, in the Korean Intellectual Property Office, the disclosure of which is incorporated by reference herein in its entirety.

TECHNICAL FIELD

The disclosure relates to a content sharing technology based on a head mounted display device.

BACKGROUND

As the mobile market has become mature, a wearable electronic device, so called, a wearable device that provides a new type of function in association with an existing mobile device has been suggested. An example of the wearable device may include a head mounted display (HMD) device that is mounted on an eye region of the user. The HMD device satisfies various experience needs of the user while providing contents, such as a virtual reality (VR) or an augmented reality (AR), which has a cubic effect.

The above information is presented as background information only to assist with an understanding of the disclosure. No determination has been made, and no assertion is made, as to whether any of the above might be applicable as prior art with regard to the disclosure.

SUMMARY

The contents provided through the head mounted display (HMD) device may be shared with an external device that establishes a network with the HMD device. Then, the shared contents may not agree with the attribute (e.g., whether contents for both eyes are managed or not) of the external device. In this case, the shared contents cannot be reproduced on the external device or may be abnormally reproduced while hampering immersion of the user of the external device on the contents.

Aspects of the disclosure are to address at least the above-mentioned problems and/or disadvantages and to provide at least the advantages described below. Accordingly, an aspect of the disclosure is to provide a method for sharing contents by which contents that are optimized for an external device may be shared by processing a format of the contents that are to be shared such that the format of the contents corresponds to the attribute of the external device, and an electronic device supporting the same.

In accordance with an aspect of the disclosure, an electronic device that interacts with a HMD device is provided. The electronic device includes a communication interface, a memory, a display, and at least one processor electrically connected to the communication interface, the memory, and the display.

According to an embodiment, the at least one processor may be configured to receive an event signal related to sharing of contents with at least one external device or receive request information related to sharing of contents from the at least one external device through the communication interface, identify attribute information of the at least one external device, convert a format of one or more of the contents, which are stored in the memory, such that the format of the one or more contents corresponds to the identified attribute information, and transmit the contents, the format of which has been converted, to the at least one external device through the communication interface.

According to various embodiments, contents that are optimized for an external device may be shared, and an easy content sharing function may be provided.

According to various embodiments, immersion of a user of an external device on contents may be improved.

In addition, the disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4A illustrates a first user interface (UI) of an electronic device according to an embodiment of the disclosure;

Throughout the drawings, like reference numerals will be understood to refer to like parts, components, and structures.

DETAILED DESCRIPTION

Figure 1:
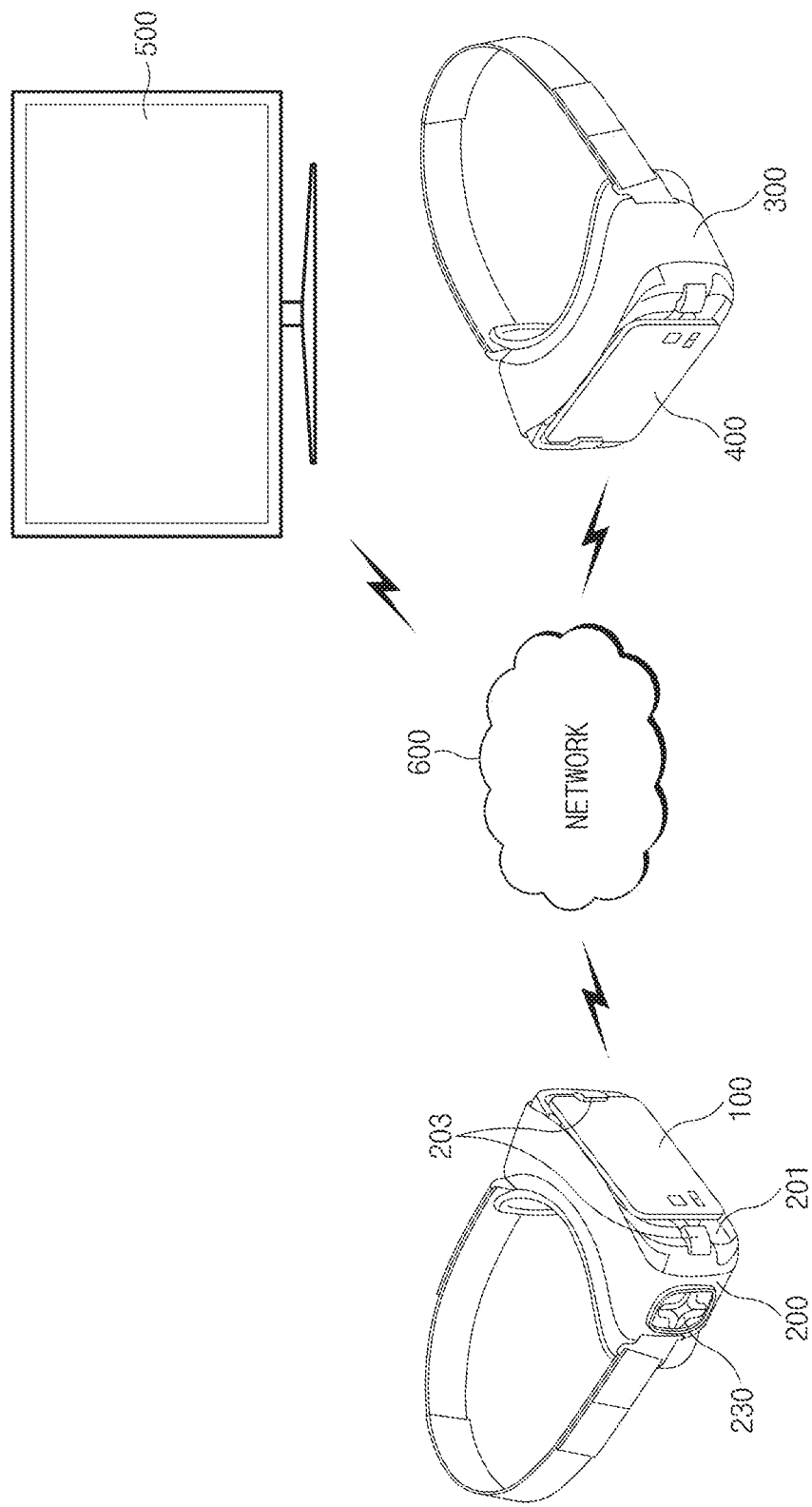
FIG. 1 illustrates a management environment for an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the disclosure, but are not intended to limit the elements. For instance, "a first user device" and "a second user device" may indicate different user devices regardless of order or importance. For example, a first component may be referred to as a second component and vice versa without departing from the scope and spirit of the disclosure.

In various embodiments of the disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general-purpose processor (for example, a central processing unit (CPU) or application processor (AP)) for performing corresponding operations by executing at least one software program stored in a memory device.

Terms used in various embodiments of the disclosure are used to describe certain embodiments of the disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the specification are not intended to be interpreted as excluding embodiments of the disclosure.

An electronic device according to various embodiments of the disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group phase 1 or phase 2 (MPEG-1 or MPEG-2) audio layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head mounted device (HMD)), a textile- or clothing-integrated-type device (e.g., an electronic apparel), a body-attached-type device (e.g., a skin pad or a tattoo), or a bio-implantable-type device (e.g., an implantable circuit).

In some various embodiments of the disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame.

In other various embodiments of the disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the disclosure may be a flexible device. An electronic device according to an embodiment of the disclosure is not limited to the above-mentioned devices, and may include new electronic devices with the development of new technology.

Hereinafter, an electronic device according to various embodiments of the disclosure will be described in more detail with reference to the accompanying drawings. The term "user" used herein may refer to a person who uses an electronic device or may refer to a device (e.g., an artificial intelligence electronic device) that uses an electronic device.

FIG. 1 illustrates a management environment for an electronic device according to an embodiment of the disclosure.

Referring to FIG. 1, a management environment for an electronic device 100 according to an embodiment may include a head mounted display (HMD) device 200 and at least one external device 400 and/or 500. The electronic device 100 may share contents selected in response to control of the user or contents that is being currently reproduced with the at least one external device 400 and/or 500. In this operation, the electronic device 100 may identify an attribute of the at least one external device 400 and/or 500, and may determine a format of contents that will be shared with the at least one external device 400 and/or 500 according to the identified attribute.

In an embodiment, the electronic device 100 (hereinafter, referred to as a first electronic device in FIG. 1) may be managed while interacting with the HMD device 200 (hereinafter, referred to as a first HMD device in FIG. 1). In this regard, the first electronic device 100 may be coupled to the first HMD device 200. For example, the first electronic device 100 may be detachably coupled to the first HMD device 200 based on at least one coupling member 203 provided on a front frame 201 of the first HMD device 200. Alternatively, the first electronic device 100 may be included in the first HMD device 200. For example, the first electronic device 100 may be mounted in the interior of the first HMD device 200, or may be included in the first HMD device 200 to be physically or functionally integrated with the first HMD device 200.

In an embodiment, the first electronic device 100 may help the user watch one or more contents (e.g., a still image or a video). In this regard, the first electronic device 100 may include a display that outputs one or more contents in response to a user input or specific scheduling information. The first electronic device 100 may be coupled such that the display faces the front frame 201 of the first HMD device 200. Accordingly, the user may watch the contents output from the display of the first electronic device 100 through a lens assembly (not illustrated) included on the front frame 201 of the first HMD device 200. In this operation, the first electronic device 100 may execute a monocular mode (e.g., a function of outputting one screen in one display area) or a binocular mode (e.g., a function of dividing one display area to a plurality of areas and outputting the same or different screens on the divided areas). When the first electronic device 100 outputs contents based on the binocular mode, the user may watch virtual reality (VR) or augmented reality (AR) contents through the first HMD device 200.

In another embodiment, the user may be helped to watch contents by a display provided in the interior of the first HMD device 200. For example, when the first electronic device 100 is mounted in the interior of the first HMD device 200 or is integrated with the first HMD device 200, the first HMD device 200 may include a display in the interior thereof. The display included in the first HMD device 200 may output one or more contents in response to a user input applied to an input/output interface 230 (e.g., a touchpad, a keypad, or a wheel) of the first HMD device 200.

In an embodiment, the first electronic device 100 may establish a network 600 with at least one external device 400 and/or 500 to be connected to the external device 400 and/or 500 communicatively or functionally. Further, the first electronic device 100 may establish a communication channel with the at least one external device 400 and/or 500 based on a short range wireless communication scheme. The first electronic device 100 and the at least one external device 400 and/or 500 may transmit and receive data related to management of functions through the network 600 or the communication channel. For example, the first electronic device 100 may share (or transmit) at least some of the contents that are being output or the contents stored in a memory with (or to) the at least one external device 400 and/or 500. In various embodiments, the at least one external device 400 and/or 500 may include a display device, such as a smartphone, a tablet personal computer (PC), a desktop PC, a laptop PC, a television, a digital video disk (DVD) player, or a HMD device. Meanwhile, the at least one external device 400 and/or 500 is not limited to the above-mentioned devices, but may include various devices that may perform a display-based content output function.

In an embodiment, the at least one external device 400 and/or 500 with which the first electronic device 100 shares contents may include the same type of device that is operated in an environment that is the same as or similar to the first electronic device 100. For example, the at least one external device 400 and/or 500 may include a second electronic device 400 that is operated while interacting with a second HMD device 300 in a way that is the same as or similar to the first electronic device 100. Alternatively, the at least one external device 400 and/or 500 may include a device of a type that is dissimilar to the first electronic device 100, such as a third electronic device 500 (e.g., a TV). The at least one external device 400 and/or 500 may include a communication interface that may establish a network 600 or a communication channel with the first electronic device 100 (or the first HMD device 200), a memory that stores contents received through the communication interface, or a display or an audio device that outputs the contents.

In an embodiment, the formats (e.g., a monocular mode, a binocular mode, a resolution, or a screen ratio) of the contents that are output (or reproduced) from the first electronic device 100 and the at least one external device 400 and/or 500 may be the same or different. For example, the first electronic device 100 and the second electronic device 400 may output monocular contents or binocular contents, and the third electronic device 500 (e.g., a TV) may output only monocular contents. Further, even if the first electronic device 100 and the second electronic device 400 output binocular contents in the same way, the resolutions or screen ratios may be different according to the performance of a device or the interacting HMD device. In this regard, the first electronic device 100 may determine the format of the shared contents based on attribute information (e.g., whether binocular content(s) are managed, the screen ratio, the resolution, or whether a sound is supported) of the at least one external device 400 and/or 500. Hereinafter, various embodiments related to control of the format of the contents that are to be shared and functional operations of the elements that realize the embodiments will be described below.

Figure 2:
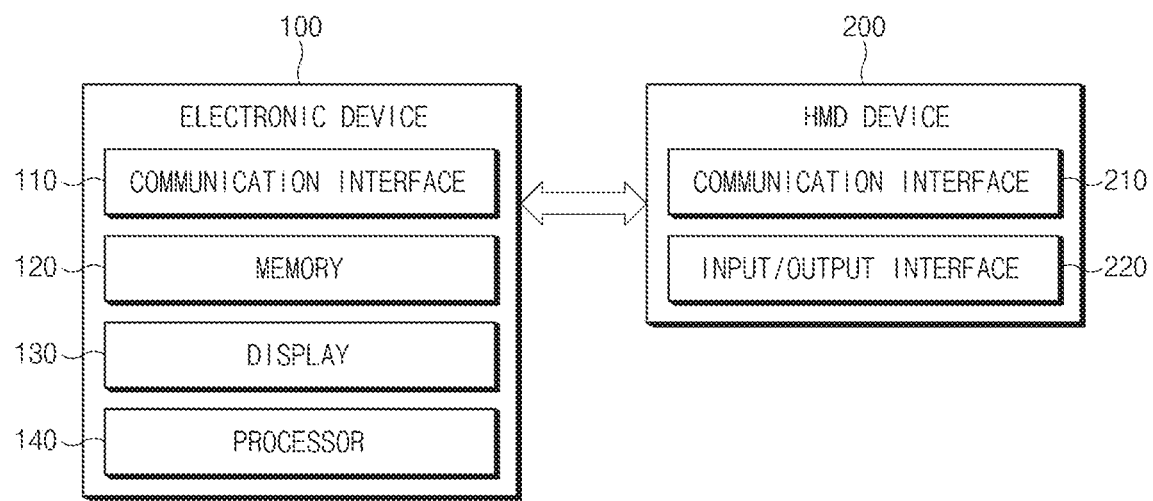
FIG. 2 illustrates a configuration of an electronic device according to an embodiment of the disclosure.

FIG. 2 illustrates a configuration of an electronic device according to an embodiment of the disclosure.

Referring to FIG. 2, the electronic device 100 may include a communication interface 110, a memory 120, a display 130 and a processor 140 (e.g., at least one processor). In various embodiments, the electronic device 100 may exclude at least one of the elements or may additionally include another element. For example, the electronic device 100 may further include a power supply device (e.g., a battery) that supplies electrical energy to the elements or a sensor module (e.g., a proximity luminance sensor, an acceleration sensor, a fingerprint recognition sensor or an iris sensor) that senses various pieces of information on a management environment of the electronic device 100. Alternatively, the electronic device 100 may further include the elements of the electronic device 701 that will be described with reference to FIG. 7.

The communication interface 110 (or a communication circuit) may access a network 600 (FIG. 1) based on wired communication or wireless communication or establish a specific communication channel with the at least one external device 400 and/or 500 (FIG. 1) to perform communication with the at least one external device 400 and/or 500 (FIG. 1). The network may include at least one of a computer network (e.g., a local area network (LAN) or a wide area network (WAN)), the Internet, and a telephone network. In an embodiment, the communication interface 110 may include a cable, a connector, or a port that supports transmission and reception of signals or data to and from the HMD device 200.

In various embodiments, the wireless communication is a cellular communication protocol, and may include at least one of long-term evolution (LTE), LTE-advanced (LTE-A), code division multiple access (CDMA), wideband CDMA (WCDMA), a universal mobile telecommunications system (UMTS), wireless broadband (WiBro), or a global system for mobile communications (GSM). Further, the wireless communication may include short range communications, such as Wi-Fi, Bluetooth (BT), near field communication (NFC), and magnetic stripe transmission (MST).

The memory 120 may store one or more data related to management of functions of the electronic device 100 or may store a command related to functional operations of the elements of the electronic device 100. Alternatively, the memory 120 may store one or more contents or may store an application program that supports reproduction of the contents. In an embodiment, the memory 120 may include a database for the at least one external device 400 and/or 500 that communicates with the electronic device 100 based on the network 600 or the specific communication channel. The database, for example, may include identification information (e.g., the type of the device or a device unique identifier (DUID), allocated code information, communication channel information, or network subscription information) of the at least one external device 400 and/or 500, attribute information (e.g., whether binocular contents are managed, a screen ratio, a resolution, or whether a sound is supported), or history information (e.g., a content sharing history).

In various embodiments, the memory 120 may include at least one of a volatile memory (e.g., a dynamic random-access memory (DRAM), a static RAM (SRAM), a synchronous DRAM (SDRAM), or the like) or a non-volatile memory (e.g., a one-time programmable read only memory (OTPROM), a programmable ROM (PROM), an erasable and programmable ROM (EPROM), an electrically erasable and programmable ROM (EEPROM)), a mask ROM, a flash ROM, and a flash memory.

The display 130 may output one or more contents (e.g., a still image or a video) in response to a user input or specific scheduling information. The display 130, for example, may output the contents through one screen or a plurality of divided screens according to a content output function (or a content output scheme or a content output mode) set by the user. Further, the display 130 may output at least one user interface (UI) related to setting of sharing of the contents.

In various embodiments, the display 130, for example, may include at least one of a liquid crystal display (LCD), a light emitting diode (LED) display, an organic LED (OLED) display, a microelectromechanical system (MEMS) display, or an electronic paper display.

The processor 140 may be electrically or functionally connected to at least one element of the electronic device 100 to perform control of the element, communication calculation, or data processing. For example, the processor 140 may share (transmit) at least some of the contents reproduced through the display 130 or the contents stored in the memory 120 with (to) the at least one external device 400 and/or 500 connected via the network 600 or the specific communication channel. In this regard, in an embodiment, the processor 140 may authenticate the at least one external device 400 and/or 500 with which the contents are to be shared, based on identification information (e.g., a type of the device, a device unique identifier (DUID), allocated code information, communication channel information, or network subscription information) of the at least one external device 400 and/or 500 included in the database. The processor 140 may collect attribute information (e.g., whether binocular contents are managed, a screen ratio, a resolution, or whether a sound is supported) on the at least one authenticated external device 400 and/or 500. The processor 140 may convert the format (e.g., a monocular mode or a binocular mode, a resolution, or a screen ratio) of the contents in response to control of the user in consideration of the attribute information of the at least one external device 400 and/or 500, and may share (or transmit) the converted format with (or to) a specific external device. In various embodiments, when the contents are related to security, the processor 140 may perform specific authentication or re-authentication on the specific external device in an operation of sharing contents.

The HMD device 200 that interacts with the electronic device 100 may support reproduction of virtual reality (VR) or augmented reality (AR) contents in relation to watching of contents of the user, and may receive a user input related to control of reproduction of contents and deliver the received user input to the electronic device 100. In an embodiment, the HMD device 200 may include a communication interface 210 and an input/output interface 220. The communication interface 210 may perform communication with the electronic device 100 or the at least one external device 400 and/or 500 based on wired communication or wireless communication. In an embodiment, the communication interface 210 may include a connector or a port. The input/output interface 220 (e.g., a touchpad, a keypad, a joystick, or a wheel) may deliver a signal or data for an input applied by the user to the electronic device 100 by using the communication interface 210. In various embodiments, the HMD device 200 may further include at least one speaker module (not illustrated). When contents are reproduced on the display 130 of the electronic device 100, the at least one speaker module may receive sound data related to the reproduction of the contents from the electronic device 100 and, for example, may output the received sound data in a stereo scheme.

In various embodiments, the HMD device 200 may include at least some of the above-mentioned elements of the electronic device 100. For example, when the electronic device 100 is embedded in the HMD device 200 or is physically or functionally integrated with the HMD device 200, the HMD device 200 may include the above-mentioned elements (e.g., the memory 120, the display 130, or the processor 140) of the electronic device 100. The HMD device 200 may perform the functions of the elements of the electronic device 100 instead based on the elements (e.g., the memory, the display, or the processor). For example, the HMD device 200 may output one or more contents stored in the memory on the display, and may share (or transmit) the contents stored in the memory or the contents that are being output on the display with (or to) the at least one external device 400 and/or 500 under the control of the controller.

Figure 3:
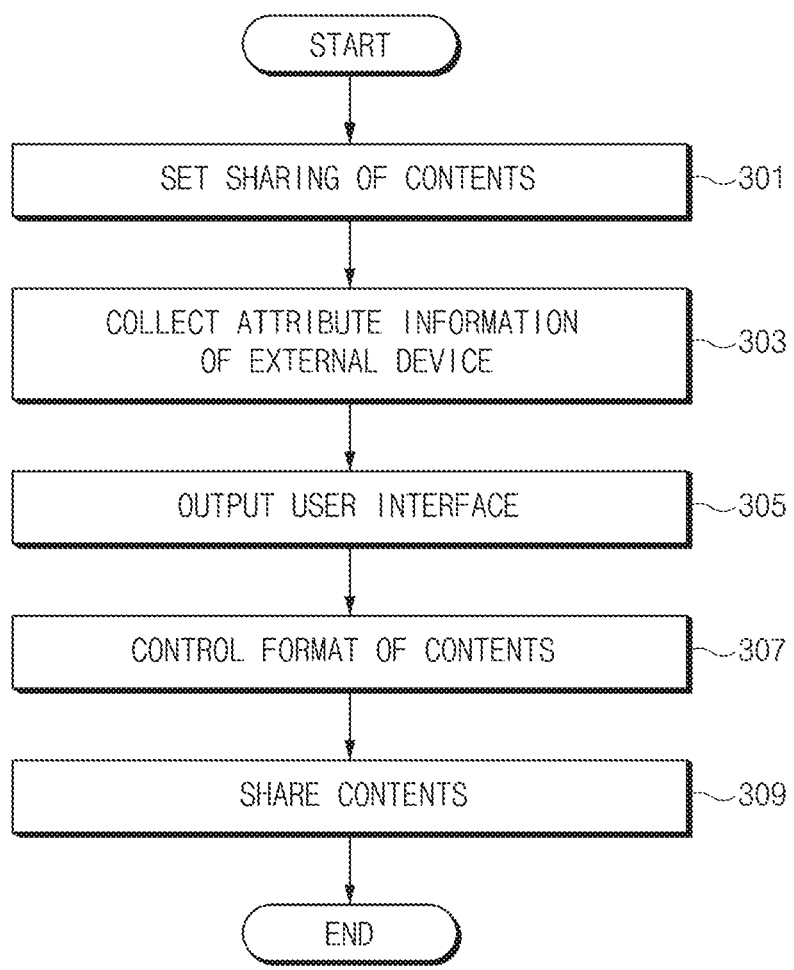
FIG. 3 illustrates a method for sharing contents of an electronic device according to an embodiment of the disclosure.

FIG. 3 illustrates a method for sharing contents of an electronic device according to an embodiment of the disclosure.

Referring to FIG. 3, in operation 301, the processor 140 (FIG. 2) of the electronic device 100 (FIG. 2) may set whether contents are being shared with the at least one external device 400 and/or 500 (FIG. 1) based on control of the user. According to various embodiments, the contents may include at least one of the contents that are being reproduced through the display 130 (FIG. 2) of the electronic device or the contents stored in the memory 120 (FIG. 2).

In an embodiment, the processor may set whether the contents are to be shared, based on a user input applied to a first UI. In this regard, the processor may perform an authentication process for at least one external device stored in a memory by using identification information of the at least one external device, and may output the first UI including a list of the at least one authenticated external device. The processor may receive a user input applied to a partial area of the list through the input/output interface 220 (FIG. 2) (e.g., a touchpad, a keypad, a joystick, or a wheel) of the HMD device 300 (FIG. 2). For example, when the user input selects a specific item of the list, the processor may activate or deactivate the sharing of contents for the external device corresponding to the selected item.

In another embodiment, the processor may set sharing of the contents based on a request for sharing of the contents transmitted from the at least one external device. In this regard, the processor may receive a request for authentication and a request for sharing of contents from a specific external device. For example, the processor may receive the request for authentication and the request for sharing of contents at the same time. Alternatively, the processor may receive a request of authentication, and may receive a request for sharing of contents after processing authentication according to a user input related to approval of the request of authentication. If the request for authentication and the request for sharing of contents are completely received, the processor may output a second UI including the content sharing request information. The processor may approve or reject the request for sharing of contents for the specific external device based on a user input applied to a partial area of the second UI through the input/output interface of the HMD device.

In operation 303, the processor may collect attribute information (e.g., whether binocular contents are managed, a screen ratio, a resolution, or whether a sound is supported) on the at least one external device with which the contents are to be shared. For example, the processor may obtain attribute information of the at least one external device from the database constructed in the memory, or may request attribute information from the at least one external device with which the contents are to be shared to obtain the attribute information.

In operation 305, the processor may output a third UI on the display. The third UI, for example, may include at least one of format information (e.g., a monocular mode or a binocular mode, a resolution, or a screen ratio) of the contents that are to be shared, or attribute information on the at least one external device with which the contents are to be shared. In various embodiments, in order that the user may easily recognize format information of the contents and/or attribute information on the at least one external device, the processor may display the information on the third UI in a form of an image, an icon, or a text.

In operations 307 and 309, the processor may convert the format of the contents that are to be shared, based on a user input applied to the third UI through the input/output interface of the HMD device. As an example, when a user input related to sharing of contents with the first external device is applied to the third UI, the processor may convert the format of the contents such that the format of the contents corresponds to the attribute information of the first external device and may transmit data of the contents, the format of which has been converted, to the first external device. Similarly, when a user input applied to the third UI is related to a second external device, the processor may convert the format of the contents such that the format of the contents corresponds to the attribute information of the second external device and may transmit data of the contents, the format of which has been converted, to the second external device. In an embodiment, when a user input applied to the third UI is generated such that the format of the contents is not converted, the processor may transmit content data while maintaining the current format of the contents that are to be shared.

Figure 4B:
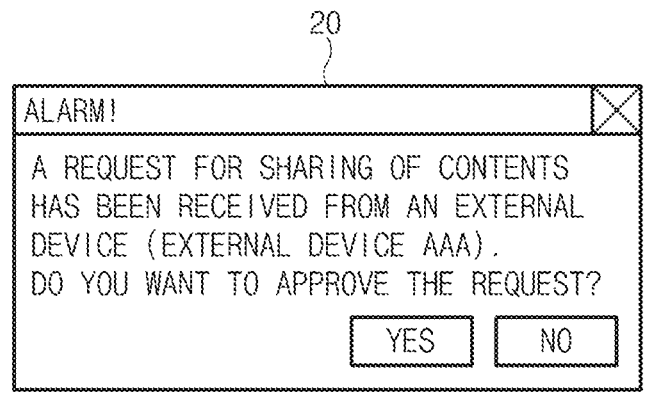
FIG. 4B illustrates a second UI of an electronic device according to an embodiment of the disclosure.
Figure 4C:
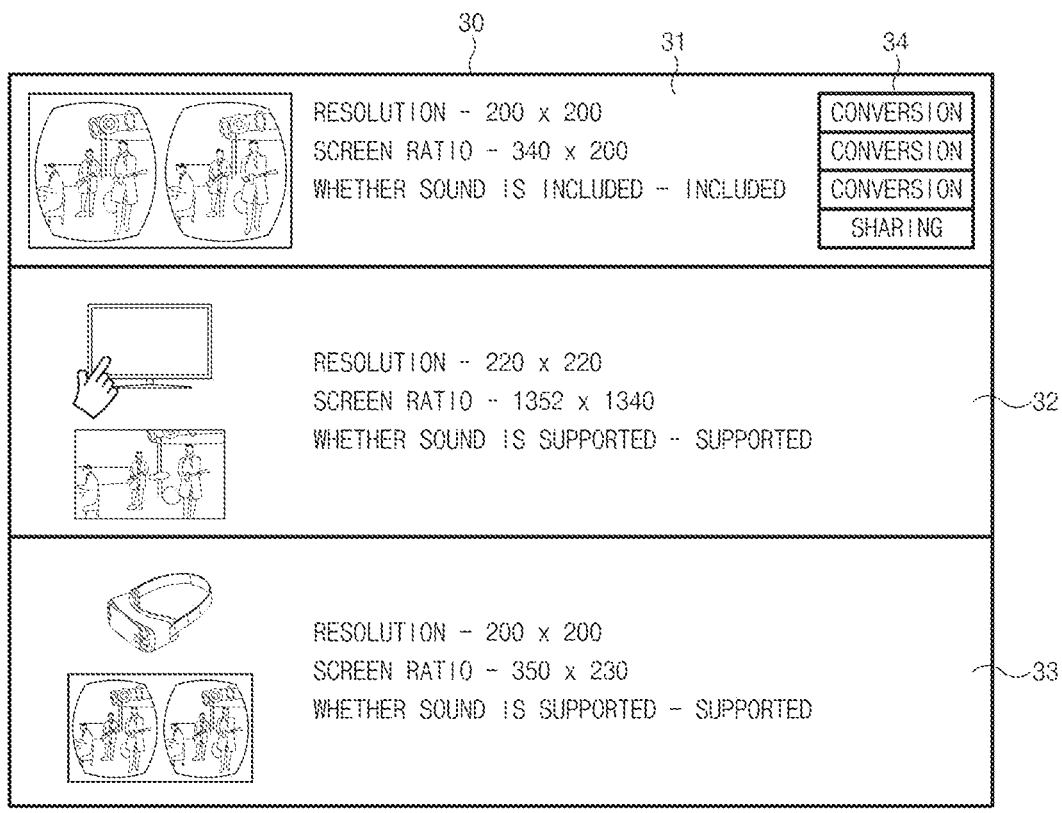
FIG. 4C illustrates a third UI of an electronic device according to an embodiment of the disclosure.

FIGS. 4A to 4C illustrate various UIs of an electronic device according to various embodiments of the disclosure.

Referring to FIG. 4A, a processor 140 (FIG. 2) of an electronic device 100 (FIG. 2) may output a first UI 10 on a display 130 (FIG. 2) in response to control of the user. In an embodiment, the processor 140 may set sharing of contents with at least one external device (or activation or deactivation of sharing of the contents) based on a user input applied to the first UI 10. The at least one external device, for example, may include at least one specific external device that may be connected to at least one external device or a network 600 (FIG. 1) on a database established in a memory 120 (FIG. 2). In this regard, the processor 140 may display at least one external device list on the first interface 10 with reference to identification information and/or history information (e.g., content sharing history information) for at least one external device included in the database. In an embodiment, the at least one external device included in the first UI 10 may be understood as an external device authenticated by the identification information and/or the history information. Further, the processor 140 may detect at least one specific external device that may access a network 600 or a communication channel which the electronic device 100 accesses through search of the surroundings, and may display at least one authenticated external device list on the first UI 10 after performing authentication for the at least one detected external device. In various embodiments, network (600) subscription information or communication channel information of the external device may be referenced for the authentication for the at least one detected external device. For example, when network (600) subscription information or communication channel information for the at least one detected external device is on the database of the memory 120, the processor 140 may determine the at least one detected external device as an authenticated device while referring to the subscription information or the communication channel information of the network 600 as an authentication history. The processor 140 may receive a user input applied to the first UI 10 through an input/output interface 220 (FIG. 2) (e.g., a touchpad, a keypad, a joystick, or a wheel) of an HMD device 200 (FIG. 2), and may set sharing of contents (or activation or deactivation of sharing) with the at least one external device listed based on the user input. As an example, when a user input that switches on sharing of contents with external device CCC is received, the processor 140 may activate a content sharing function for external device CCC.

In another embodiment, the setting of the sharing of the contents with the at least one external device may be processed according to a request for sharing of contents transmitted from the at least one authenticated external device. In this regard, referring to FIG. 4B, when receiving a request for sharing of contents from the at least one authenticated external device, the processor 140 may output a second UI 20 on a display 130. The second UI 20, for example, may include content sharing request information and/or at least one text or icon related to determination of approval of the request for sharing of contents. The processor 140 may activate or deactivate a content sharing function for at least one external device that transmitted a request for sharing of contents, based on a user input related to approval or rejection of the request for sharing of contents.

In an embodiment, the processor 140 may collect attribute information of at least one external device, of which a content sharing function is activated, through at least one of the first UI 10 or the second UI 20. If collecting the attribute information for the at least one external device, the processor 140 may control the display to output a third UI 30 as in FIG. 4C. The third UI 30, for example, may include at least one of format information 31 of contents that are to be shared, or attribute information 32 and/or 33 of at least one external device, of which the content sharing function is activated. If a user input is applied to an attribute information (32) area of a specific external device (e.g., a TV device) to the third UI 30, the processor 140 may display an object 34 that supports conversion of the format of the contents or sharing of the contents at at least a portion of a content format information (31) area. The processor 140 may convert the format of the contents that are to be shared such that the format of the contents corresponds to the attribute information 32 of the specific external device (e.g., a TV device) based on a user input applied to the object 34, or may share the contents with the specific external device (e.g., a TV device). In response, if a user input is applied to an attribute information (33) area of another specific external device (e.g., an external HMD device) on the third UI 30, the processor 140 may redisplay the object 34 at at least a portion of a content format information (31) area. In an embodiment, the processor 140 may share the contents after converting the format of the contents or may share the contents without converting the format of the contents according to the user input applied to the object 34.

Figure 5:
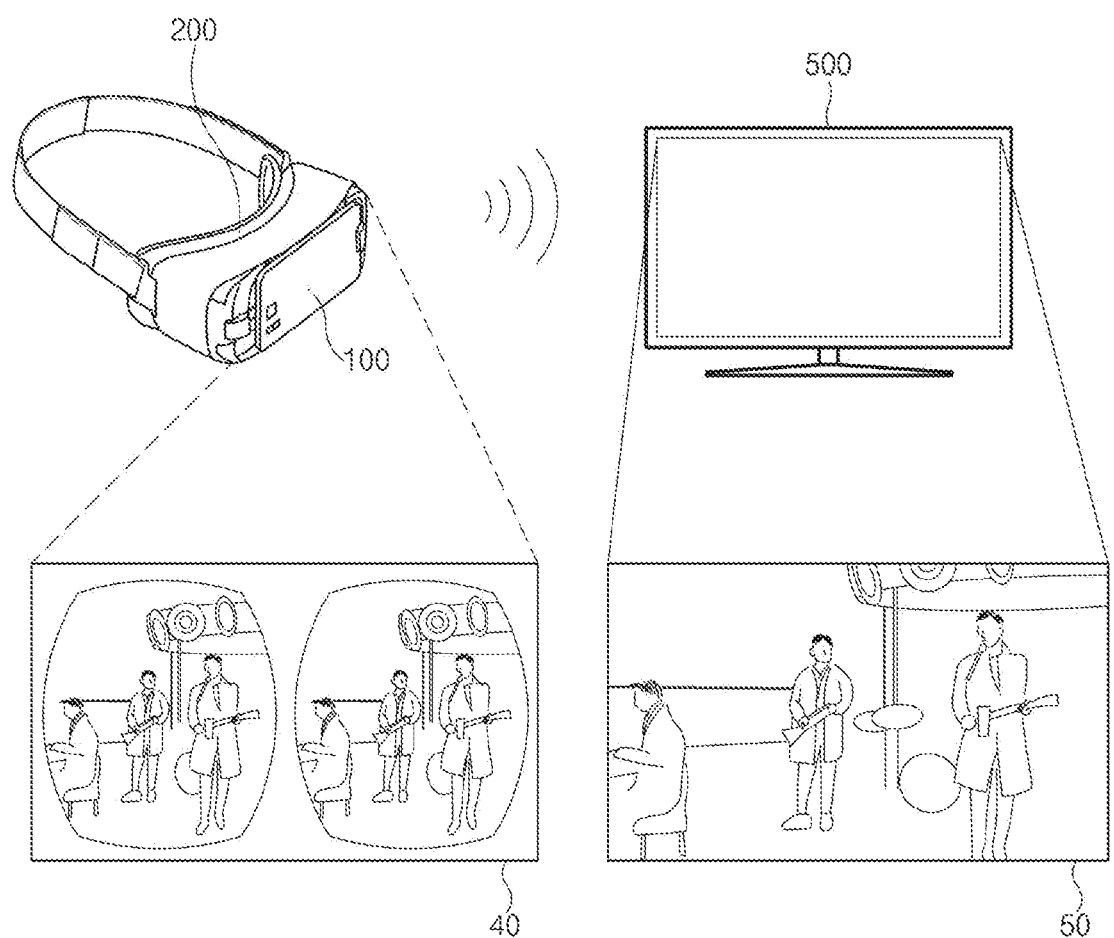
FIG. 5 illustrates a content sharing form of an electronic device according to a first embodiment of the disclosure.

FIG. 5 illustrates a content sharing form of an electronic device according to a first embodiment of the disclosure.

Referring to FIG. 5, a first external device 500 (e.g., a TV device) set to a content sharing target (or of which a content sharing function is activated) may be a device that is dissimilar to an electronic device 100. In this case, the formats of the contents that may be managed in the electronic device 100 and the first external device 500 may be different. For example, the contents that are to be shared by the electronic device 100 may be binocular contents 40, and monocular contents 50 may be managed by the first external device 500. In this regard, the processor 140 may output a third UI 30 (FIG. 4C) including at least one of format information of the contents 40 that are to be shared or attribute information of the first external device 500, and may convert the format of the contents 40 based on a user input applied to the third UI 30. For example, the processor 140 may convert the contents 40 (e.g., binocular contents) that are to be shared to monocular contents 50 that may be managed by the first external device 500. Further, the processor 140 may further convert a resolution and/or a screen ratio of the monocular contents 50 converted based on the attribute information of the first external device 500. For example, the processor 140 may convert a resolution and/or a screen ratio of the converted monocular contents 50 to a resolution and/or a screen ratio that are the same as or similar to the resolution and/or the screen ratio supported by the first external device 500. Further, the processor 140 may enlarge or reduce the size of the screen of the converted monocular contents 50. The processor 140 may transmit data for the converted monocular contents 50 to at least one of the first external device 500, or a server or a set-top box related to the first external device 500 through a specific channel (e.g., a user input back channel (UIBC)).

Figure 6A:
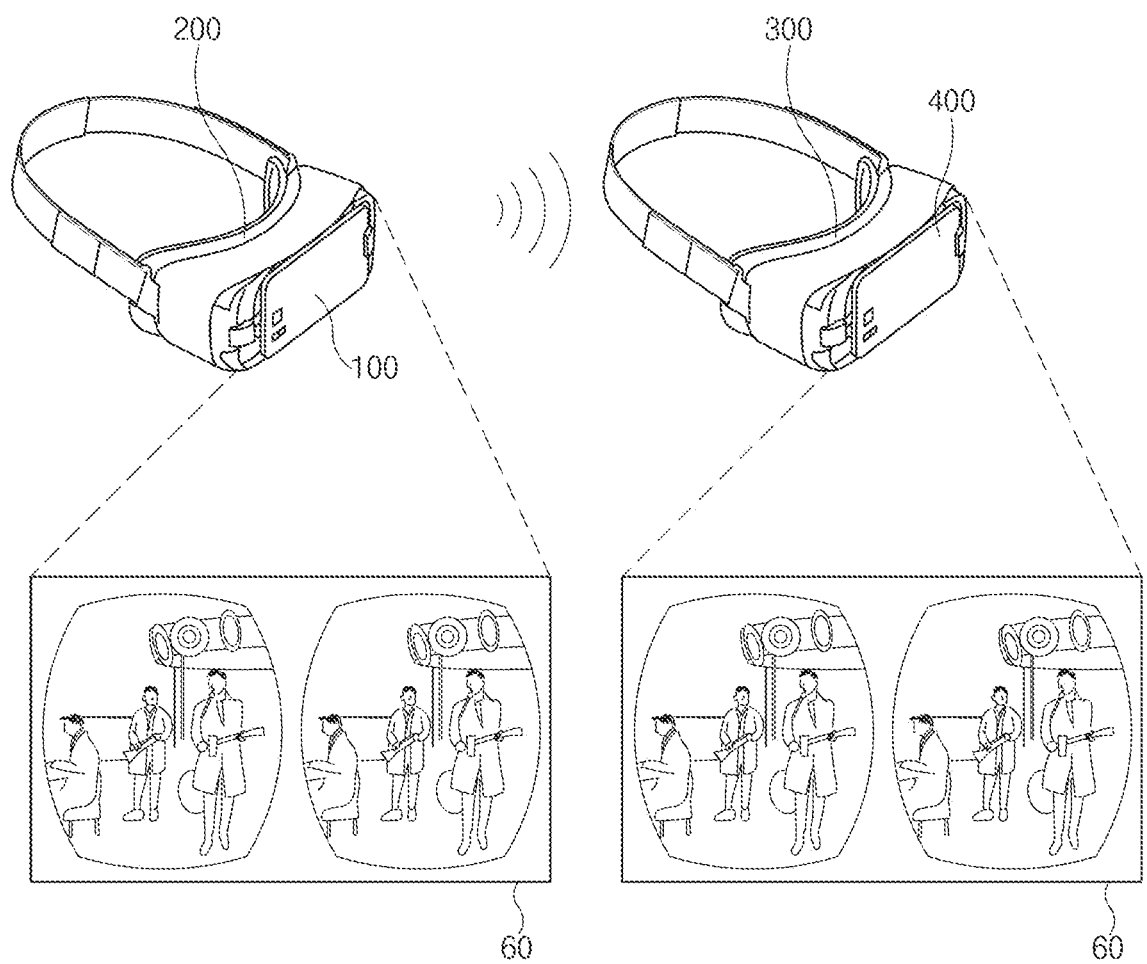
FIG. 6A illustrates a content sharing form of an electronic device according to a second embodiment of the disclosure.
Figure 6B:
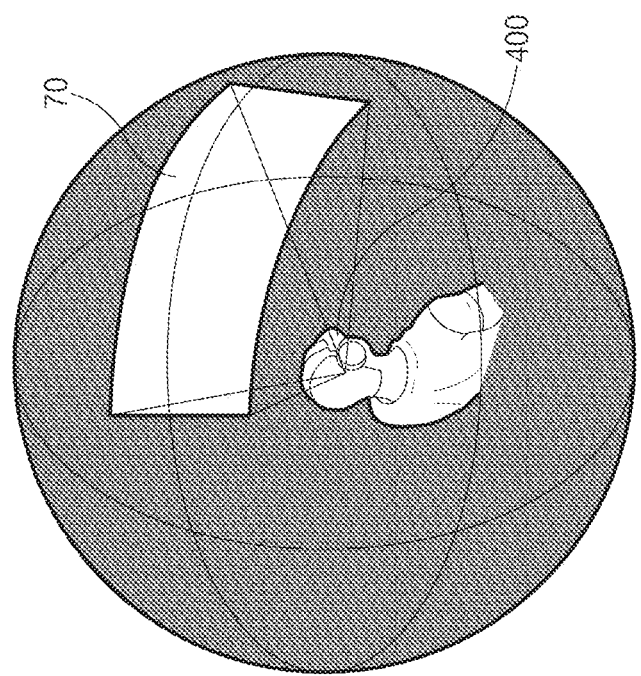
FIG. 6B illustrates an example of a form of shared contents according to a second embodiment of the disclosure.
Figure 6B:
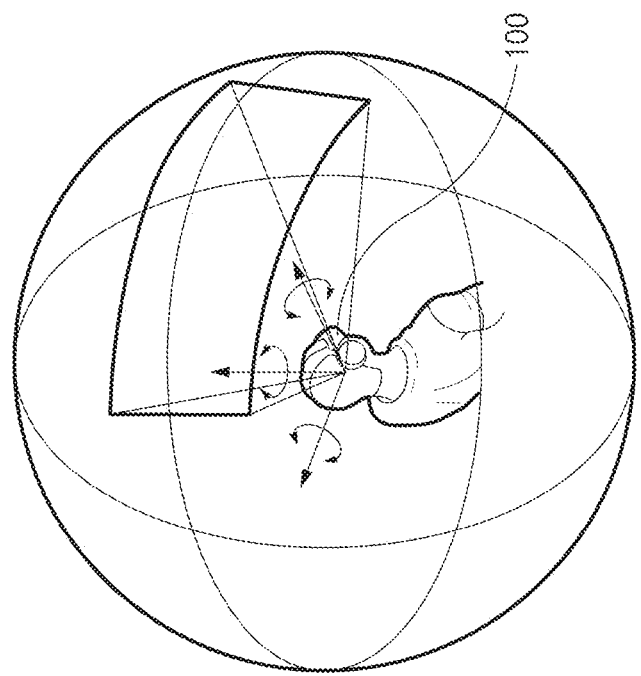
Figure 6C:
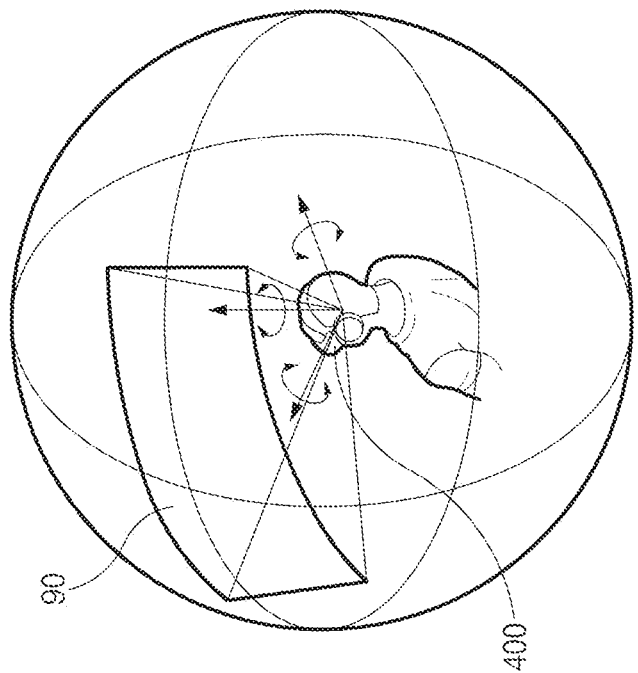
FIG. 6C illustrates another example of a form of shared contents according the second embodiment of the disclosure.
Figure 6C:
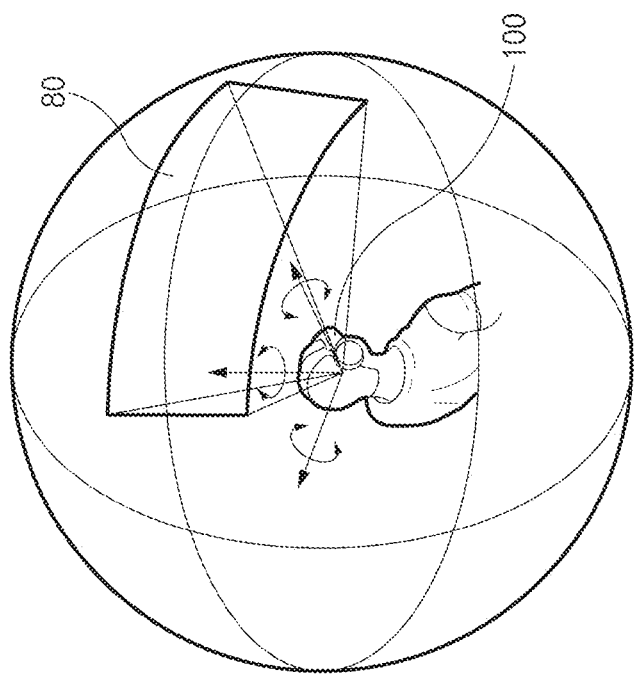

FIG. 6A illustrates a content sharing form of an electronic device according to a second embodiment of the disclosure. FIGS. 6B and 6C illustrate various examples of a form of shared contents according a second embodiment of the disclosure.

Referring to FIG. 6A, an electronic device 100 (the first electronic device mentioned in FIG. 1) and a second external device 400 (the second electronic device mentioned in FIG. 1) with which contents are to be shared may be the same type of devices that are managed in the same or similar environments. For example, the second external device 400 may be managed while interacting with the HMD device 300 in a way that is the same as or similar to the electronic device 100. In this regard, a processor 140 (FIG. 2) of the electronic device 100, for example, may request management state information from the second external device 400, and may determine whether the second external device 400 and the HMD device 300 interact with each other based on the management state information. In an embodiment, when the second external device 400 interacts with the HMD device 300, the second external device 400 may manage a format of contents that is the same as or similar to the first electronic device 100. For example, the second external device 400 and the electronic device 100 may manage binocular contents 60.

In an embodiment, the processor 140 may determine conversion of the formats, such as a resolution, a screen ratio, a sound, or lens characteristics of the contents that are to be shared, based on the attribute information of the second external device 400. In this operation, the processor 140 may convert the resolution and/or the screen ratio of the binocular contents 60 that are to be shared to a format supported by the second external device 400. Further, the processor 140 may share sound data related to the binocular contents 60 together with the binocular contents (60) data or may share the binocular contents (60) data while excluding the sound data according to whether a sound of the second external device 400 is supported. Further, the processor 140 may share at least some of the binocular contents 60 while distorting the binocular contents 60 according to the lens characteristics of the HMD device 300 that interacts with the second external device 400. If the format information (e.g., a resolution or a screen ratio) of the binocular contents 60 that are to be shared and the attribute information (e.g., a resolution, a screen ratio, or whether a sound is supported) of the second external device 400 correspond to each other, the processor 140 may share the binocular contents 60 with the second external device 400 based on a specific channel (e.g., a user input back channel (UIBC)) without converting the format of the contents separately.

In another embodiment, when determining that the second external device 400 does not interact with the HMD device 300, the processor 140 may convert the format of the binocular contents 60 that are to be shared to monocular contents, and may further convert the format, such as a resolution, a screen ratio, or a sound according to necessities to share the converted monocular contents with the second external device 400.

Referring to FIG. 6B, in an embodiment, the processor 140 may share binocular contents including only data on a partial area of a display area that is relatively large as compared with a screen area of the display 130 (FIG. 2) based on control of the user or a request of the external device 400 in relation to sharing of the binocular contents having the display area. In this regard, the processor 140 may receive a user input that specifies the partial area on the above-mentioned third UI 30 (FIG. 4C). For example, the processor 140 may display a deployment image (not illustrated) on the binocular contents in a content format information (FIG. 4C) area of the third UI 30, and may determine that the specific area corresponding to the user input (e.g., a touch) on the deployment image as the partial area that is to be shared with the external device 400. Alternatively, the processor 140 may receive a request for sharing of the binocular contents having a specific display area from the external device 400 with which the binocular contents are to be shared. The processor 140 may extract only data related to the specific display area on data of the binocular contents having a display area that is larger than the screen area of the display 130, and may share the extracted data with the external device 400. Accordingly, when the user of the external device 400 watches shared binocular contents, the user may view only the specific display area 70. As mentioned above, the processor 140 may exclude a display area related to security or privacy from the binocular contents, or may highlight the specific display area such that the contents may be shared.

Referring to FIG. 6C, the processor 140 may share the whole data of the binocular contents having a display area that is relatively large as compared with the screen area of the display 130 with the external device 400. For example, if a user input that specifies a display area of the binocular contents that are to be shared is not applied to the deployment image displayed on the third UI 30 or a request for sharing of the binocular contents having a specific display area is not received from the external device 400, the processor 140 may share the binocular contents in which the display area is not specified with the external device 400. Accordingly, the user of the external device 400 may watch not only a first display area 80 of the binocular contents that are being watched (or being displayed on the display 130 of the electronic device 100) by the user of the electronic device 100 but also a second display area 90 that is different from the first display area 80.

In accordance with an aspect of the disclosure, there is provided an electronic device that interacts with a HMD device, the electronic device including a communication interface, a memory, a display, and at least one processor electrically connected to the communication interface, the memory, and the display, and configured to control the communication interface to perform communication with at least one external device, to control the memory to store one or more contents, and to control the display to output the one or more contents.

According to various embodiments, the at least one processor may be configured to receive an event signal related to sharing of contents with at least one external device or receive request information related to sharing of contents from the at least one external device through the communication interface, identify attribute information of the at least one external device, convert a format of one or more of the contents, which are stored in the memory, such that the format of the one or more contents corresponds to the identified attribute information, and transmit the contents, the format of which has been converted, to the at least one external device through the communication interface.

According to various embodiments, the at least one processor may be configured to transmit content data for a partial display area specified through control of a user or by the at least one external device to the at least one external device in relation to sharing of contents having a display area of an area that is relatively large as compared with a screen area of the display.

According to various embodiments, the at least one processor may be configured to perform authentication for the at least one external device based on at least one of information on a history of sharing of contents with the at least one external device, information on a specific communication channel with the at least one external device, or information on subscription of the at least one external device to a specific network.

According to various embodiments, the at least one processor may be configured to output a first UI including the information of the at least one authenticated external device and set sharing of contents with the at least one authenticated external device based on a user input applied to the first UI.

According to various embodiments, the at least one processor may be configured to receive a request for sharing of contents from the at least one authenticated external device and output a second UI including information related to the request for the sharing of the contents.

According to various embodiments, the at least one processor may be configured to determine conversion of a format of contents that are to be shared with reference to attribute information of the at least one external device including at least one of management of binocular contents of the at least one external device, screen ratio information supported by the at least one external device, resolution information supported by the at least one external device, or sound support information of a sound of the at least one external device.

According to various embodiments, the at least one processor may be configured to output a third UI including at least one of format information for the contents that are to be shared or attribute information of the at least one external device, and process conversion of a format of contents related to at least one of setting of a monocular or binocular mode of the contents that are to be shared, setting of a resolution, setting of a screen ratio, or setting of sound data.

According to various embodiments, the at least one processor may be configured to transmit the contents that are to be shared to the at least one external device based on a specific communication channel.

According to various embodiments, the at least one processor may be configured to store at least one of identification information, attribute information, or content sharing history information for the at least one external device in the memory as a database.

In accordance with another aspect of the disclosure, there is provided an electronic device that interacts with a HMD device, the electronic device including a communication interface, a memory, a display, and at least one processor electrically connected to the communication interface, the memory, and the display, and configured to control the communication interface to perform communication with at least one external device, to control the memory to store one or more contents, and to control the display to output the one or more contents, wherein the at least one processor is configured to receive an event signal related to sharing of contents with the at least one external device or receive request information related to sharing of contents from the at least one external device, identify attribute information of the at least one external device, when format information of the contents that are to be shared and attribute information of the at least one external device correspond to each other, transmitting the contents that are to be shared to the at least one external device without converging the format of the contents that are to be shared, and when the format information of the contents that are to be shared and the attribute information of the at least one external device do not correspond to each other, convert the format of the contents that are to be shared such that the format corresponds to the attribute information of the at least one external device to transmit the contents that are to be shared to the at least one external device.

In accordance with another aspect of the disclosure, there is provided a content sharing method of an electronic device that interacts with a HMD device, the content sharing method including determining sharing of contents with at least one external device, collecting attribute information for the at least one external device with which the contents are to be shared, converting a format of the contents that are to be shared, based on the attribute information, and transmitting the contents, the formats of which has been converted, to the at least one external device with which the contents are to be shared.

According to various embodiments, the determining of the sharing of the contents may include performing authentication for the at least one external device based on at least one of information on a history of sharing of contents with the at least one external device, information on a specific communication channel with the at least one external device, or information on subscription of the at least one external device to a specific network.

According to various embodiments, the determining of the sharing of the contents may further include outputting a first UI including information of the at least one authenticated external device, and receiving a request for sharing of contents from the at least one authenticated external device and outputting a second UI including information related to the request for the sharing of the contents.

According to various embodiments, the determining of the sharing of the contents may further include setting sharing of contents for a specific external device based on a user input applied to at least one of the first UI or the second UI.

According to various embodiments, the collecting of the attribute information may include determining conversion of a format of contents that are to be shared with reference to attribute information of the at least one external device including at least one of management of binocular contents of the at least one external device, screen ratio information supported by the at least one external device, resolution information supported by the at least one external device, or sound support information of a sound of the at least one external device.

According to various embodiments, the converting of the format of the contents may include outputting a third UI including at least one of format information for the contents that are to be shared or attribute information of the at least one external device.

According to various embodiments, the converting of the format of the contents may further include converting a format of contents related to at least one of setting of a monocular or binocular mode of the contents that are to be shared, setting of a resolution, setting of a screen ratio, or setting of sound data based on a user input applied to the third UI.

According to various embodiments, the converting of the format of the contents may include specifying a partial display area, which is to be shared, of a display area having an area that is relatively large as compared with a screen area of a display of the electronic device according to control of a user or a request of the at least one external device in relation to sharing of contents having the display area.

According to various embodiments, the converting of the format of the contents may further include extracting data for the display area having an area that is relatively large as compared with a screen area of the display of the electronic device, from data of the contents having the display area.

According to various embodiments, the transmitting of the contents to the at least one external device may include transmitting the contents that are to be shared, based on a specific communication channel.

According to various embodiments, the content sharing method may further include storing at least one of identification information, attribute information, or content sharing history information for the at least one external device as a database.

According to various embodiments, the content sharing method may further include approving or rejecting the request for sharing of the contents from the at least one authenticated external device based on a user input applied to a partial area of the second user interface through an input/output interface of the HMD device.

Figure 7:
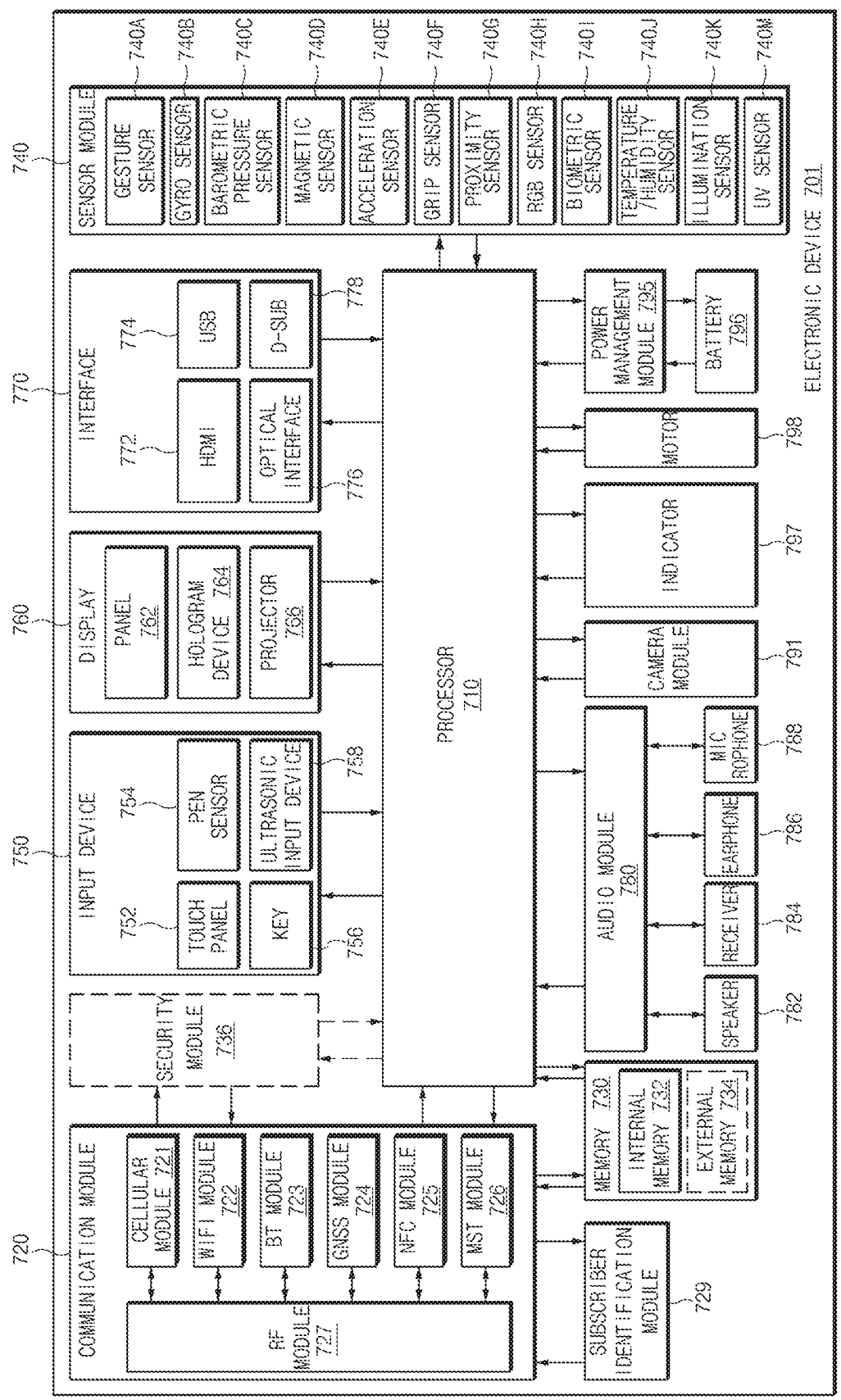
FIG. 7 illustrates a block diagram of an electronic device according to an embodiment of the disclosure.

FIG. 7 illustrates a block diagram of an electronic device according to an embodiment of the disclosure.

Referring to FIG. 7, the electronic device 701 may include, for example, all or part of an electronic device 100 shown in FIG. 2. The electronic device 701 may include one or more processors 710 (e.g., application processors (APs)), a communication module 720 (e.g., a transceiver), a subscriber identification module (SIM) 729, a memory 730, a security module 736, a sensor module 740, an input device 750, a display 760, an interface 770, an audio module 780, a camera module 791, a power management module 795, a battery 796, an indicator 797, and a motor 798.

The processor 710 may drive, for example, an operating system (OS) or an application program to control a plurality of hardware or software components connected thereto and may process and compute a variety of data. The processor 710 may be implemented with, for example, a system on chip (SoC).

According to an embodiment of the disclosure, the processor 710 may include a graphic processing unit (GPU) (not shown) and/or an image signal processor (ISP) (not shown). The processor 710 may include at least some (e.g., a cellular module 721) of the components shown in FIG. 7. The processor 710 may load a command or data received from at least one of other components (e.g., a non-volatile memory) into a volatile memory to process the data and may store various data in a non-volatile memory.

The communication module 720 may have the same or similar configuration to the communication interface 110 of FIG. 2. The communication module 720 may include, for example, the cellular module 721, a Wi-Fi module 722, a Bluetooth (BT) module 723, a global navigation satellite system (GNSS) module 724 (e.g., a GPS module, a Glonass module, a Beidou module, or a Galileo module), a near field communication (NFC) module 725, an MST module 726, and a radio frequency (RF) module 727.

The cellular module 721 may provide, for example, a voice call service, a video call service, a text message service, or an Internet service, and the like through a communication network. According to an embodiment of the disclosure, the cellular module 721 may identify and authenticate the electronic device 701 in a communication network using the SIM 729 (e.g., a SIM card). According to an embodiment of the disclosure, the cellular module 721 may perform at least part of functions which may be provided by the processor 710. According to an embodiment of the disclosure, the cellular module 721 may include a communication processor (CP).

The Wi-Fi module 722, the BT module 723, the GNSS module 724, the NFC module 725, or the MST module 726 may include, for example, a processor for processing data transmitted and received through the corresponding module. According to various embodiments of the disclosure, at least some (e.g., two or more) of the cellular module 721, the Wi-Fi module 722, the BT module 723, the GNSS module 724, the NFC module 725, or the MST module 726 may be included in one integrated chip (IC) or one IC package.

The RF module 727 may transmit and receive, for example, a communication signal (e.g., an RF signal). Though not shown, the RF module 727 may include, for example, a transceiver, a power amplifier module (PAM), a frequency filter, or a low noise amplifier (LNA), or an antenna, and the like. According to another embodiment of the disclosure, at least one of the cellular module 721, the Wi-Fi module 722, the BT module 723, the GNSS module 724, the NFC module 725, or the MST module 726 may transmit and receive an RF signal through a separate RF module.

The SIM 729 may include, for example, a card which includes a SIM and/or an embedded SIM. The SIM 729 may include unique identification information (e.g., an integrated circuit card identifier (ICCID)) or subscriber information (e.g., an international mobile subscriber identity (IMSI)).

The memory 730 (e.g., a memory 120 of FIG. 2) may include, for example, an embedded memory 732 or an external memory 734. The embedded memory 732 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 734 may include a flash drive, for example, a compact flash (CF), a secure digital (SD), a micro-SD, a mini-SD, an extreme digital (xD), a multimedia card (MMC), or a memory stick, and the like. The external memory 734 may operatively and/or physically connect with the electronic device 701 through various interfaces.

The security module 736 may be a module which has a relatively higher secure level than the memory 730 and may be a circuit which stores secure data and guarantees a protected execution environment. The security module 736 may be implemented with a separate circuit and may include a separate processor. The security module 736 may include, for example, an embedded secure element (eSE) which is in a removable smart chip or a removable SD card or is embedded in a fixed chip of the electronic device 701. Also, the security module 736 may be driven by an OS different from the OS of the electronic device 701. For example, the security module 736 may operate based on a java card open platform (JCOP) OS.

The sensor module 740 may measure, for example, a physical quantity or may detect an operation state of the electronic device 701, and may convert the measured or detected information to an electric signal. The sensor module 740 may include at least one of, for example, a gesture sensor 740A, a gyro sensor 740B, a barometric pressure sensor 740C, a magnetic sensor 740D, an acceleration sensor 740E, a grip sensor 740F, a proximity sensor 740G, a color sensor 740H (e.g., red, green, blue (RGB) sensor), a biometric sensor 740I, a temperature/humidity sensor 740J, an illumination sensor 740K, or an ultraviolet (UV) sensor 740M. Additionally or alternatively, the sensor module 740 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 740 may further include a control circuit for controlling at least one or more sensors included therein. According to various embodiments of the disclosure, the electronic device 701 may further include a processor configured to control the sensor module 740, as part of the processor 710 or to be independent of the processor 710. While the processor 710 is in a sleep state, the electronic device 701 may control the sensor module 740.

The input device 750 may include, for example, a touch panel 752, a (digital) pen sensor 754, a key 756, or an ultrasonic input device 758. The touch panel 752 may use at least one of, for example, a capacitive type, a resistive type, an infrared type, or an ultrasonic type. Also, the touch panel 752 may further include a control circuit. The touch panel 752 may further include a tactile layer and may provide a tactile reaction to a user.

The (digital) pen sensor 754 may be, for example, part of the touch panel 752 or may include a separate sheet for recognition. The key 756 may include, for example, a physical button, an optical key, or a keypad. The ultrasonic input device 758 may allow the electronic device 701 to detect a sound wave using a microphone (e.g., a microphone 788) and to verify data through an input tool generating an ultrasonic signal.

The display 760 (e.g., a display 130 of FIG. 2) may include a panel 762, a hologram device 764, or a projector 766. The panel 762 may include the same or similar configuration to the display 130 of FIG. 2. The panel 762 may be implemented to be, for example, flexible, transparent, or wearable. The panel 762 and the touch panel 752 may be integrated into one module. The hologram device 764 may show a stereoscopic image in a space using interference of light. The projector 766 may project light onto a screen to display an image. The screen may be positioned, for example, inside or outside the electronic device 701. According to an embodiment of the disclosure, the display 760 may further include a control circuit for controlling the panel 762, the hologram device 764, or the projector 766.

The interface 770 may include, for example, a high-definition multimedia interface (HDMI) 772, a universal serial bus (USB) 774, an optical interface 776, or a D-subminiature 778. The interface 770 may be included in, for example, the communication interface 110 shown in FIG. 2. Additionally or alternatively, the interface 770 may include, for example, a mobile high definition link (MHL) interface, an SD card/multimedia card (MMC) interface, or an infrared data association (IrDA) standard interface.

The audio module 780 may convert a sound and an electric signal in dual directions. At least part of components of the audio module 780 may be included in, for example, an input and output interface. The audio module 780 may process sound information input or output through, for example, a speaker 782, a receiver 784, an earphone 786, or the microphone 788, and the like.

The camera module 791 may be a device which captures a still image and a moving image. According to an embodiment of the disclosure, the camera module 791 may include one or more image sensors (not shown) (e.g., a front sensor or a rear sensor), a lens (not shown), an image signal processor (ISP) (not shown), or a flash (not shown) (e.g., an LED or a xenon lamp).

The power management module 795 may manage, for example, power of the electronic device 701. According to an embodiment of the disclosure, though not shown, the power management module 795 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 796 and voltage, current, or temperature thereof while the battery 796 is charged. The battery 796 may include, for example, a rechargeable battery or a solar battery.

The indicator 797 may display a specific state of the electronic device 701 or part (e.g., the processor 710) thereof, for example, a booting state, a message state, or a charging state, and the like. The motor 798 may convert an electric signal into mechanical vibration and may generate vibration or a haptic effect, and the like. Though not shown, the electronic device 701 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a MediaFLO™ standard, and the like.

Each of the above-mentioned elements of the electronic device according to various embodiments of the disclosure may be configured with one or more components, and names of the corresponding elements may be changed according to the type of the electronic device. The electronic device according to various embodiments of the disclosure may include at least one of the above-mentioned elements, some elements may be omitted from the electronic device, or other additional elements may be further included in the electronic device. Also, some of the elements of the electronic device according to various embodiments of the disclosure may be combined with each other to form one entity, thereby making it possible to perform the functions of the corresponding elements in the same manner as before the combination.

Figure 8:
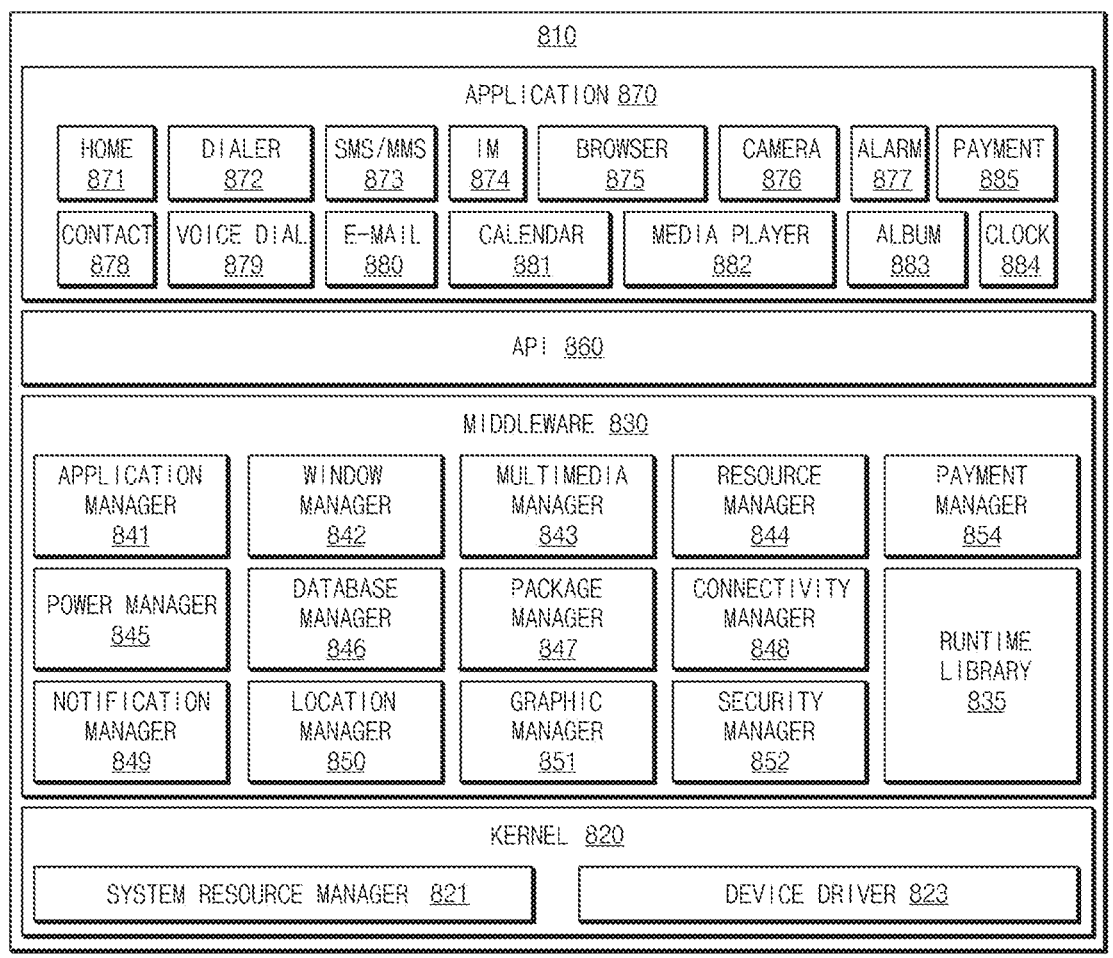
FIG. 8 illustrates a block diagram of a program module according to an embodiment of the disclosure.

FIG. 8 illustrates a block diagram of a program module according to an embodiment of the disclosure.

According to an embodiment of the disclosure, the program module 810 may include an operating system (OS) for controlling resources associated with an electronic device (e.g., an electronic device 100 of FIG. 2) and/or various applications which are executed on the OS. The OS may be, for example, Android, iOS, Windows, Symbian, Tizen, or Bada, and the like.

The program module 810 may include a kernel 820, a middleware 830, an application programming interface (API) 860, and/or an application 870. At least part of the program module 810 may be preloaded on the electronic device, or may be downloaded from an external electronic device.

The kernel 820 may include, for example, a system resource manager 821 and/or a device driver 823. The system resource manager 821 may control, assign, or collect, and the like system resources. According to an embodiment of the disclosure, the system resource manager 821 may include a process management unit, a memory management unit, or a file system management unit, and the like. The device driver 823 may include, for example, a display driver, a camera driver, a BT driver, a shared memory driver, a USB driver, a keypad driver, a Wi-Fi driver, an audio driver, or an inter-process communication (IPC) driver.

The middleware 830 may provide, for example, functions the application 870 needs in common, and may provide various functions to the application 870 through the API 860 such that the application 870 efficiently uses limited system resources in the electronic device. According to an embodiment of the disclosure, the middleware 830 may include at least one of a runtime library 835, an application manager 841, a window manager 842, a multimedia manager 843, a resource manager 844, a power manager 845, a database manager 846, a package manager 847, a connectivity manager 848, a notification manager 849, a location manager 850, a graphic manager 851, a security manager 852, or a payment manager 854.

The runtime library 835 may include, for example, a library module used by a compiler to add a new function through a programming language while the application 870 is executed. The runtime library 835 may perform a function about input and output management, memory management, or an arithmetic function.

The application manager 841 may manage, for example, a life cycle of at least one of the application 870. The window manager 842 may manage graphic user interface (GUI) resources used on a screen of the electronic device. The multimedia manager 843 may determine a format utilized for reproducing various media files and may encode or decode a media file using a codec corresponding to the corresponding format. The resource manager 844 may manage source codes of at least one of the application 870, and may manage resources of a memory or a storage space, and the like.

The power manager 845 may act together with, for example, a basic input/output system (BIOS) and the like, may manage a battery or a power source, and may provide power information utilized for an operation of the electronic device. The database manager 846 may generate, search, or change a database to be used in at least one of the application

870. The package manager 847 may manage installation or update of an application distributed by a type of a package file.

The connectivity manager 848 may manage, for example, wireless connection such as Wi-Fi connection or BT connection, and the like. The notification manager 849 may display or notify events, such as an arrival message, an appointment, and proximity notification, by a method which is not disturbed to the user. The location manager 850 may manage location information of the electronic device. The graphic manager 851 may manage a graphic effect to be provided to the user or a UI related to the graphic effect. The security manager 852 may provide all security functions utilized for system security or user authentication, and the like. According to an embodiment of the disclosure, when the electronic device (e.g., an electronic device 100 of FIG. 2) has a phone function, the middleware 830 may further include a telephony manager (not shown) for managing a voice or video communication function of the electronic device.

The middleware 830 may include a middleware module which configures combinations of various functions of the above-described components. The middleware 830 may provide a module which specializes according to kinds of OSs to provide a differentiated function. Also, the middleware 830 may dynamically delete some of old components or may add new components.

The API 860 may be, for example, a set of API programming functions, and may be provided with different components according to OSs. For example, in case of Android or iOS, one API set may be provided according to platforms. In case of Tizen, two or more API sets may be provided according to platforms.

The application 870 may include one or more of, for example, a home application 871, a dialer application 872, a short message service/multimedia message service (SMS/MMS) application 873, an instant message (IM) application 874, a browser application 875, a camera application 876, an alarm application 877, a contact application 878, a voice dial application 879, an e-mail application 880, a calendar application 881, a media player application 882, an album application 883, a clock application 884, a payment application 885, a health care application (e.g., an application for measuring quantity of exercise or blood sugar, and the like), or an environment information application (e.g., an application for providing atmospheric pressure information, humidity information, or temperature information, and the like), and the like.

According to an embodiment of the disclosure, the application 870 may include an application (hereinafter, for better understanding and ease of description, referred to as "information exchange application") for exchanging information between the electronic device (e.g., the electronic device 100 of FIG. 2) and an external electronic device. The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device. Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device which communicates with the electronic device, an application which operates in the external electronic device, or a service (e.g., a call service or a message service) provided from the external electronic device.

According to an embodiment of the disclosure, the application 870 may include an application (e.g., the health card application of a mobile medical device) which is preset according to attributes of the external electronic device. According to an embodiment of the disclosure, the application 870 may include an application received from the external electronic device. According to an embodiment of the disclosure, the application 870 may include a preloaded application or a third-party application which may be downloaded from a server. Names of the components of the program module 810 according to various embodiments of the disclosure may differ according to kinds of OSs.

According to various embodiments of the disclosure, at least part of the program module 810 may be implemented with software, firmware, hardware, or at least two or more combinations thereof. At least part of the program module 810 may be implemented (e.g., executed) by, for example, a processor (e.g., a processor 710). At least part of the program module 810 may include, for example, a module, a program, a routine, sets of instructions, or a process, and the like for performing one or more functions.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the disclosure may be implemented as instructions stored in a computer-readable storage medium in the form of a program module. In the case where the instructions are performed by a processor (e.g., the processor 140 of FIG. 2), the processor may perform functions corresponding to the instructions. The computer-readable storage medium may be, for example, the memory 120 of FIG. 2.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the disclosure and vice versa.

A module or a program module according to various embodiments of the disclosure may include at least one of the above-mentioned elements, or some elements may be omitted or other additional elements may be added. Operations performed by the module, the program module or other elements according to various embodiments of the disclosure may be performed in a sequential, parallel, iterative or heuristic way. Furthermore, some operations may be performed in another order or may be omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device physically connected with a head mounted display (HMD) device including a binocular lens assembly, the electronic device comprising:
    a communication interface;
    a memory configured to store contents;
    a display; and
    at least one processor electrically connected to the communication interface, the memory, and the display,
    wherein the at least one processor is configured to:
        control the display to output a first partial display area of the contents in a binocular format which corresponds to the binocular lens assembly of the HMD device,
        control the communication interface to receive, from at least one external device, an event signal for sharing of the contents with the at least one external device or receive request information related to sharing of the contents from the at least one external device,
        control the communication interface to receive, from the at least one external device, specific display area information identifying a second partial display area of the contents,
        identify attribute information that is received by the communication interface, from the at least one external device,
        convert, based on the attribute information, the contents to include the second partial display area different from the first partial display area, and
        control the communication interface to transmit the converted contents including the second partial display area to the at least one external device through the communication interface,
    wherein the attribute information received from the at least one external device comprises at least one of a screen resolution of the at least one external device, a screen ratio of the at least one external device, or a sound setting of the at least one external device.

2. The electronic device of claim 1, wherein the at least one processor is further configured to perform authentication for the at least one external device based on at least one of information on a history of sharing of contents with the at least one external device, information on a specific communication channel with the at least one external device, or information on subscription of the at least one external device to a specific network.

3. The electronic device of claim 2, wherein the at least one processor is further configured to:

after authentication, control the display to output a first user interface including the attribute information of the at least one external device, and
set sharing of the contents with the at least one external device based on a user input applied to the first user interface.

4. The electronic device of claim 2, wherein the at least one processor is further configured to:
    control the communication interface to receive a request for sharing of the contents from the at least one external device, which is authenticated, and
    control the display to output a second user interface including information related to the request for the sharing of the contents.

5. The electronic device of claim 1, wherein the at least one processor is further configured to determine a target format for the contents based on the attribute information of the at least one external device.

6. The electronic device of claim 1, wherein the at least one processor is further configured to control the display to output a third user interface including at least one of format information for the contents or the attribute information of the at least one external device.

7. The electronic device of claim 1, wherein the at least one processor is further configured to control the communication interface to transmit the contents to the at least one external device based on a specific communication channel.

8. The electronic device of claim 1, wherein the at least one processor is further configured to store at least one of identification information, the attribute information, or content sharing history information for the at least one external device in the memory as a database.

9. The electronic device of claim 1, wherein the contents that are transmitted to the at least one external device comprises image data of the screen resolution.

10. A content sharing method of an electronic device physically connected with a head mounted display (HMD) device, which includes a binocular lens assembly, the content sharing method comprising:
    displaying, on a display of the electronic device, a first partial display area of contents in a binocular format which corresponds to the binocular lens assembly of the HMD device;
    determining whether to share the contents with at least one external device;
    collecting attribute information and specific display area information identifying a second partial display area of the contents from the at least one external device;
    converting, based on the attribute information, the contents to include the second partial display area different from the first partial display area; and
    transmitting the converted contents including the second partial display area to the at least one external device,
    wherein the attribute information received from the at least one external device comprises at least one of a screen resolution of the at least one external device, a screen ratio of the at least one external device, or a sound setting of the at least one external device.

11. The content sharing method of claim 10, wherein the determining of whether to share the contents comprises performing authentication for the at least one external device based on at least one of information on a history of sharing of contents with the at least one external device, information on a specific communication channel with the at least one external device, or information on subscription of the at least one external device to a specific network.

12. The content sharing method of claim 11, wherein the determining of whether to share the contents further comprises:
- after the authentication, outputting a first user interface including the attribute information of the at least one external device; and
- receiving a request for sharing of the contents from the at least one external device and outputting a second user interface including information related to the request.

13. The content sharing method of claim 12, wherein the determining of whether to share the contents further comprises setting sharing of the contents for the at least one external device based on a user input applied to at least one of the first user interface or the second user interface.

14. The content sharing method of claim 10, further comprising determining a target format for the contents based on the attribute information of the at least one external device.

15. The content sharing method of claim 10, further comprising outputting a third user interface including at least one of format information for the contents or the attribute information of the at least one external device.

16. The content sharing method of claim 12, further comprising approving or rejecting the request for sharing of the contents from the at least one external device based on a user input applied to a partial area of the second user interface through an input/output interface of the HMD device.

17. The content sharing method of claim 10, further comprising storing at least one of identification information, the attribute information, or content sharing history information for the at least one external device as a database.

* * * * *